(12) United States Patent
Heismann

(10) Patent No.: US 8,294,896 B2
(45) Date of Patent: Oct. 23, 2012

(54) DETERMINING IN-BAND OPTICAL SIGNAL-TO-NOISE RATIOS IN OPTICAL SIGNALS WITH TIME-VARYING POLARIZATION STATES USING POLARIZATION EXTINCTION

(75) Inventor: Fred L. Heismann, Colts Neck, NJ (US)

(73) Assignee: Acterna LLC, Germantown, MD (US)

( * ) Notice: Subject to any disclaimer, the term of this patent is extended or adjusted under 35 U.S.C. 154(b) by 696 days.

(21) Appl. No.: 12/485,251

(22) Filed: Jun. 16, 2009

(65) Prior Publication Data

US 2009/0316153 A1    Dec. 24, 2009

Related U.S. Application Data

(60) Provisional application No. 61/073,988, filed on Jun. 19, 2008.

(51) Int. Cl.
*G01J 4/00* (2006.01)
(52) U.S. Cl. .................................................. 356/364
(58) Field of Classification Search .................... None
See application file for complete search history.

(56) References Cited

U.S. PATENT DOCUMENTS

| | | | |
|---|---|---|---|
| 6,813,021 B2 | 11/2004 | Chung et al. | 356/364 |
| 7,106,443 B2 | 9/2006 | Wein et al. | 356/364 |
| 7,149,428 B2 | 12/2006 | Chung et al. | 398/68 |
| 2003/0219250 A1* | 11/2003 | Wein et al. | 398/26 |
| 2006/0051087 A1 | 3/2006 | Martin et al. | 398/26 |
| 2008/0030839 A1* | 2/2008 | Yao | 359/281 |
| 2009/0316153 A1* | 12/2009 | Heismann | 356/364 |

OTHER PUBLICATIONS

Dupont et al., Endless Polarization Control Using Two Rotatable Wave Plates with Variable Birefrigence, Feb. 2005, Science Direct, Optics Communication 252 1-6.*
M. Rasztovits-Wiech et al., "Optical Signal-to-Noise Ratio Measurement in WDM Networks Using Polarization Extinction" by European Conference on Optical Communication, Sep. 20-24, 1998, Madrid Spain, pp. 549-550.
Sun et al., "Novel Polarization Scrambling OSNR Monitor", SPIE, Bellingham WA, pp. 669-672, 2004.
Shi et al., "Simultaneous Monitoring of Both Optical Signal-to-Noise Ratio and Polarization-Mode Dispersion Using Polarization Scrambling and Polarization Beam Splitting", Journal of Lightwave Technology, New York, NY, vol. 23, No. 10, pp. 3290-3294, Oct. 1, 2005.
European Search Report for corresponding EP application No. EP09162741.

* cited by examiner

*Primary Examiner* — Gregory J Toatley
*Assistant Examiner* — Juan D Valentin, II
(74) *Attorney, Agent, or Firm* — Matthew A. Pequignot; Pequignot + Myers LLC

(57) ABSTRACT

A method and apparatus for improving the accuracy of in-band OSNR measurements using a conventional polarization extinction or polarization-nulling method. In particular, the severe degradations of the polarization extinction that result from slow and fast polarization fluctuations in the optical signal components during the in-band OSNR measurement are substantially mitigated by rapidly and/or randomly changing the state of polarization prior to conventional polarization control and filtering.

16 Claims, 13 Drawing Sheets

Improved Method for Measuring In-Band OSNR

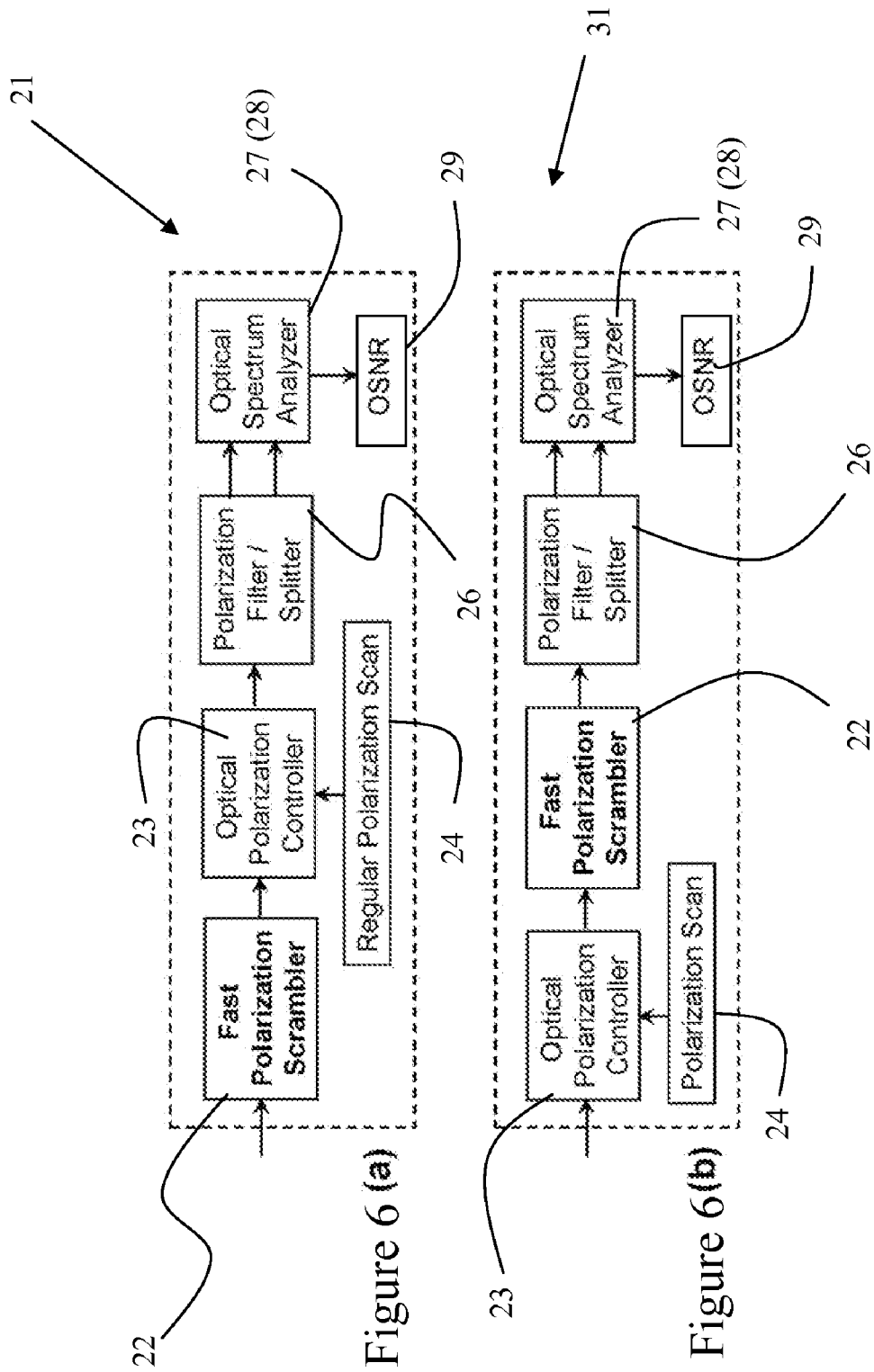

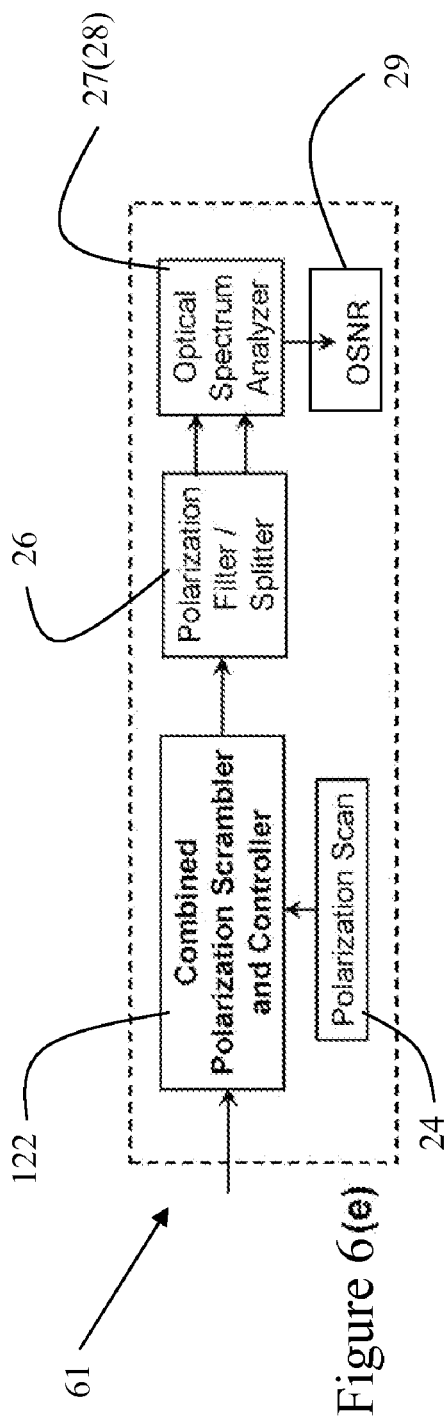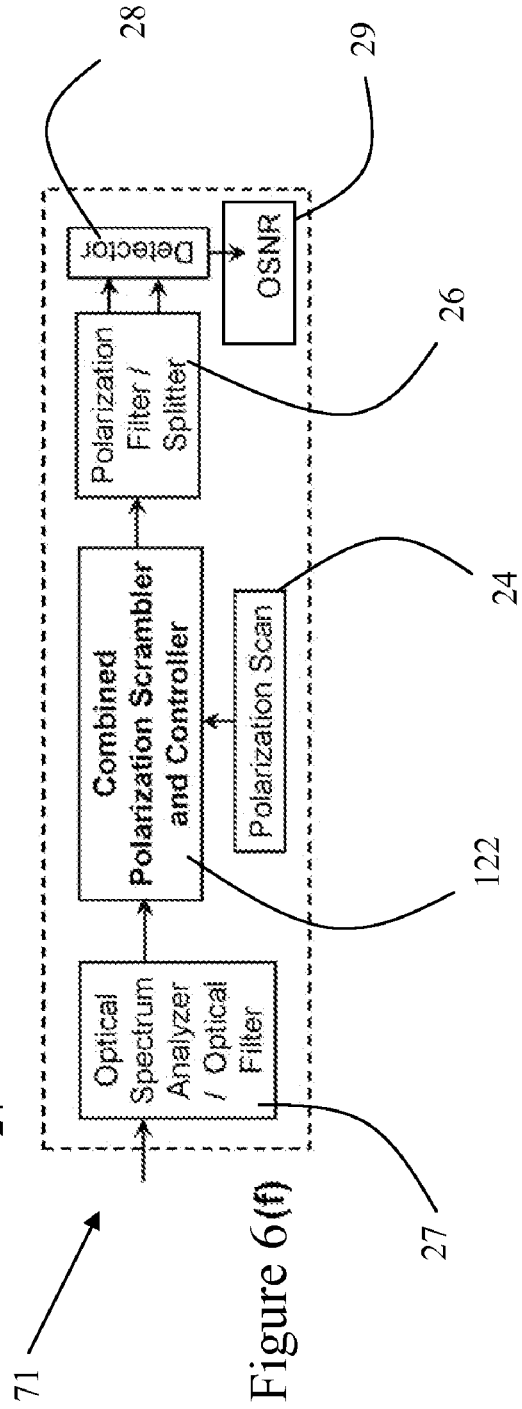
Figure 6(e)
Figure 6(f)

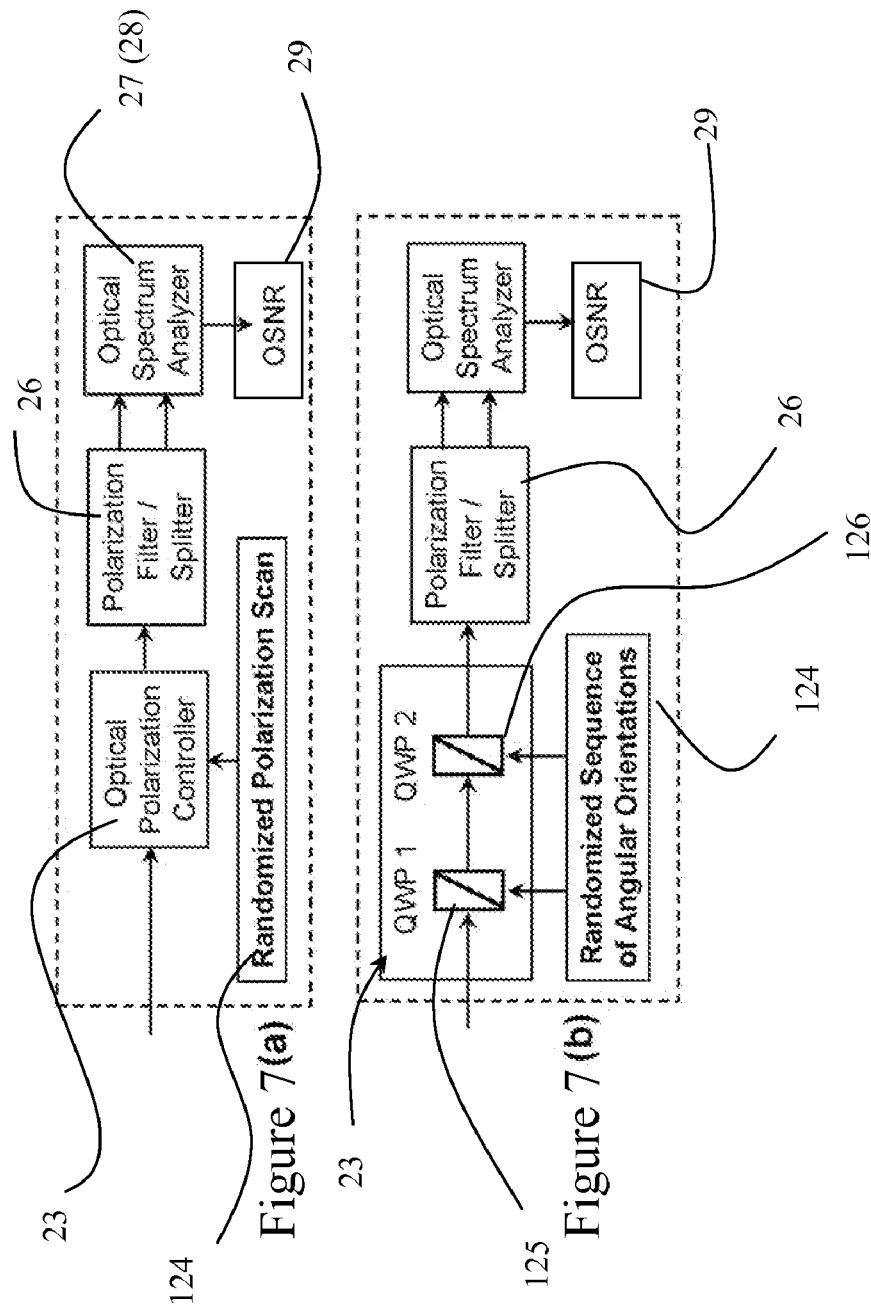

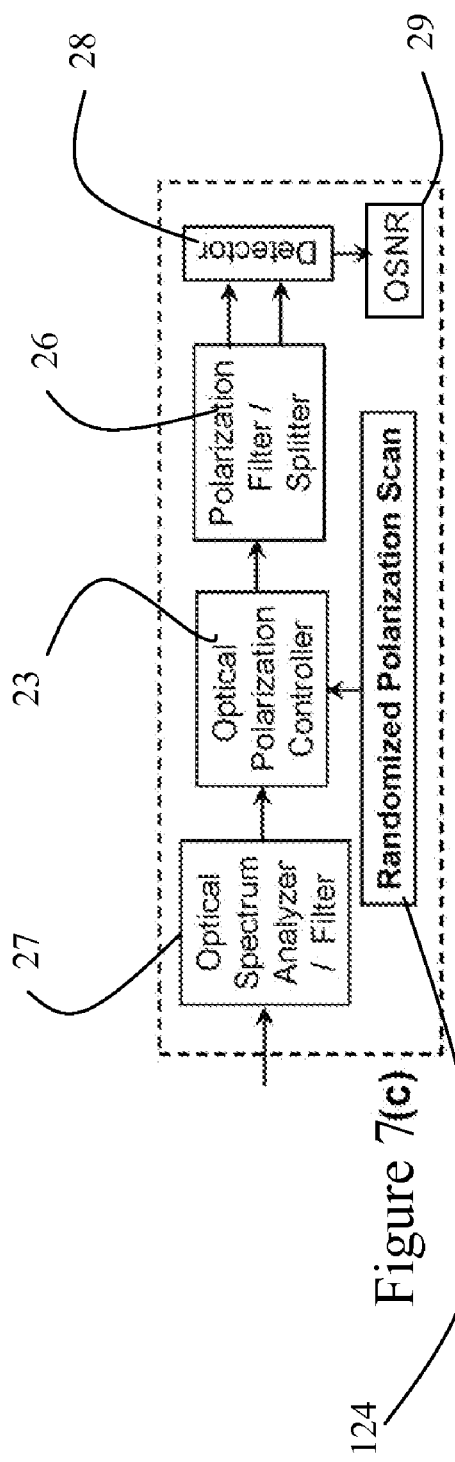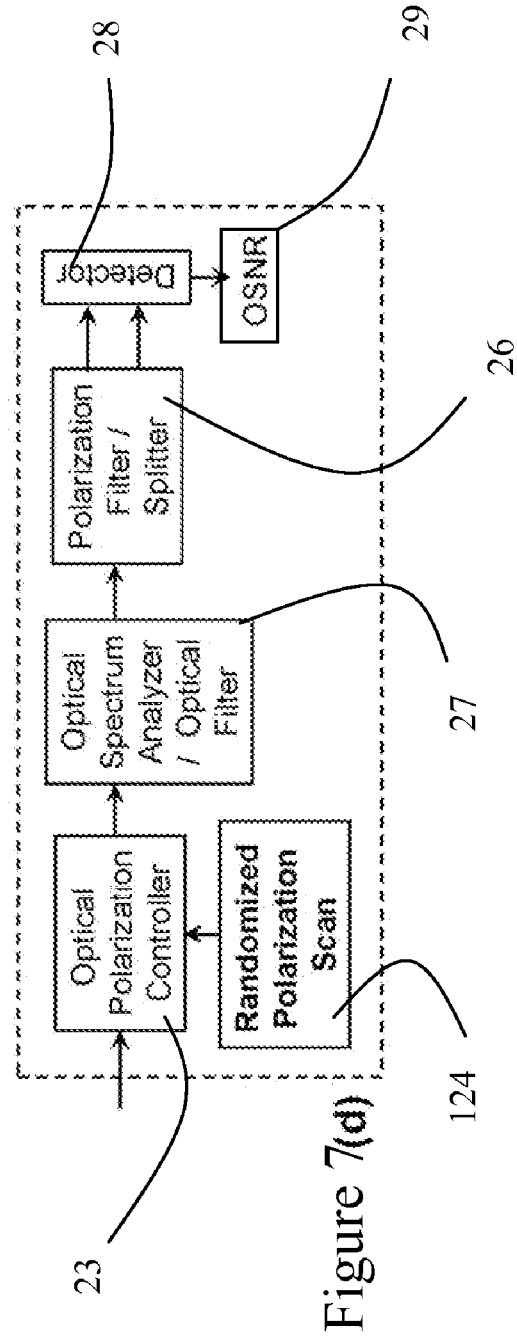
Figure 7(c)
Figure 7(d)

US 8,294,896 B2

DETERMINING IN-BAND OPTICAL SIGNAL-TO-NOISE RATIOS IN OPTICAL SIGNALS WITH TIME-VARYING POLARIZATION STATES USING POLARIZATION EXTINCTION

CROSS-REFERENCE TO RELATED APPLICATIONS

The present invention claims priority from U.S. Patent Application No. 61/073,988 filed Jun. 19, 2008, which is incorporated herein by reference.

TECHNICAL FIELD

The present invention relates to the determination of optical signal-to-noise ratios, and in particular to the use of polarization extinction to determine in-band optical signal-to-noise ratios (OSNR) in optical signals that exhibit slow or rapid variations in the state of polarization.

BACKGROUND OF THE INVENTION

Signals transmitted over long-distance fiber-optic communication systems may be severely degraded by excessive optical noise, which is introduced by optical amplifiers employed to boost signal power throughout each system. The quality of a transmitted optical signal, therefore, is frequently characterized by the optical signal-to-noise ratio (OSNR), which defines the ratio of the signal power carrying the desired information signal and the optical noise added in the communication system. In communication systems without tight optical filtering, the OSNR may be readily determined by spectral analysis of the transmitted signals, which measures the optical power of the information carrying signal as well as the spectral density of the Gaussian noise introduced by the optical amplifiers. Typically, the optical noise appears as a floor in the analyzed optical spectrum, and thus, may be readily measured at optical frequencies, where no optical information signal is transmitted.

In modern optical transmission systems with wavelength multiplexing, the various transmitted signals may be closely spaced in optical frequency, thus making it very difficult to measure the optical noise floor between adjacent signals in the received optical spectrum. In addition, the signals may be passed through narrow-band optical filters that substantially reduce the optical noise floor at frequency components, at which no information carrying signals are transmitted.

A polarization-nulling technique, which substantially removes the polarized optical information signal from the received optical signal, thus revealing the floor of the unpolarized optical noise in the optical spectrum, has been disclosed in "Optical signal-to-Noise Ratio Measurement in WDM Networks Using Polarization Extinction" by M. Rasztovits-Wiech et al., European Conference on Optical Communication, 20-24 Sep. 1998, Madrid Spain, pp. 549-550, and in U.S. Pat. No. 6,813,021 issued Nov. 2, 2004 to Chung et al, U.S. Pat. No. 7,106,443 issued Sep. 12, 2006 to Wein et al, and U.S. Pat. No. 7,149,428 issued Dec. 12, 2006 to Chung et al, which are incorporated herein by reference. The disclosed technique enables measurement of the OSNR within the bandwidth of the transmitted optical information signal, i.e. "in-band OSNR measurement", when the signal exhibits a substantially constant polarization state.

However, it is well known to those skilled in the art that the output polarization state of a signal transmitted over an optical fiber may fluctuate randomly with time, because standard optical fibers do not maintain the state of polarization of the launched signals. The speed and magnitude of the polarization fluctuations introduced in the fiber depend on the physical environment to which the fiber is exposed, and therefore, may be potentially large. Consequently, these random polarization fluctuations may severely limit in-band OSNR measurements using the polarization-extinction method or other types of polarization analysis.

According to conventional systems, in-band OSNR measurements are usually performed with a measurement apparatus 1, which comprises a tunable optical filter or spectrum analyzer 2, which is connected to a fixed or variable optical polarization state analyzer 3, as shown schematically in FIG. 1(*a*). An array of photo-detectors 4 is optically coupled to the outputs of the polarization state analyzer 3, from which the OSNR can be measured. The apparatus 1 is optically coupled to the transmission fiber 5 of an optical network. It is appreciated by those skilled in the art that the tunable optical filter 2 may either precede or follow the polarization state analyzer 3 without affecting the overall functionality of the apparatus 1.

In an alternate system illustrated in FIG. 1(*b*), a measurement apparatus 10 includes a polarization state analyzer 3' comprised of a variable optical polarization controller 6, with a scan sequencer 7, and a fixed polarization filter or splitter 8, wherein the polarization filter/splitter 8 follows the polarization controller 6. In this embodiment, the tunable filter/spectrum analyzer 2 may either be connected to the output of the polarization filter/splitter 8, as shown in FIG. 1(*b*), or it may be placed between the polarization controller 6 and the polarization filter 8. Alternatively, it may even precede the polarization controller 6. It is appreciated by those skilled in the art that the preferred arrangement of these three elements depends on the specific details of the optical transmission characteristic of the various elements and components.

In the system illustrated in FIG. 1(*b*), the polarization controller 6 is adjusted in a predetermined way by the scan sequencer 7 to transform the polarization state that is passed by the polarization filter 8 sequentially into a predetermined, incrementally, continuously varying sequence of optical input polarization states, which substantially cover the entire Poincaré sphere. An optical detector array (not shown) after the spectrum analyzer 2 then records the optical power levels of all probed polarization states at the desired optical frequency components. The signal and noise levels of the analyzed signal are determined from the maximal and minimal values of the power readings recorded for the various probed polarization states, whereby it is assumed that the power level is minimal when the polarized information signal is substantially blocked (or "nulled") by the polarization filter/splitter 8 and only unpolarized noise is passed to the optical detector. Likewise, it is assumed that the power level is maximal when the polarization state of the information signal is substantially identical to the polarization state analyzed by the polarization filter 8, in which case the entire signal and the noise are both passed to the optical detector. The OSNR in the received signal may then be estimated from a simple analysis of the measured minimal and maximal power levels, as described, for example, in the above referenced U.S. Pat. No. 7,149,428 or in United States Patent Application Publication US 2006/0051087 published Mar. 9, 2006 to Martin et al, entitled "Method for Determining the Signal-to-Noise Ratio of an Optical Signal".

For the above-described analysis of the polarization characteristics of the received optical information signal, the polarization state of the optical information signal must be substantially constant over the time period needed to cycle the polarization controller 6 through the desired sequence of polarization transformations, including the time needed to measure the optical power levels at the detector array. If the input polarization state of the optical information signal changes substantially during the time period of the OSNR measurement, the polarization controller 6 may not be able to transform the polarization state of the information signal into the two desired polarization states, i.e. the one that is substantially blocked by the polarization filter 8 and the one that is passed through the filter 8 with minimal attenuation. If none of the various polarizations states generated by the optical polarization controller 6 comes sufficiently close to both of these two states, then the OSNR estimated from the measured maximal and minimal power levels may be substantially different from the OSNR present in the received signal. As a result, the estimated OSNR is usually smaller than the true OSNR in the signal. Therefore, polarization fluctuations in the optical information signal may severely degrade in-band OSNR measurements that are obtained by polarization analysis.

An object of the present invention is to overcome the shortcomings of the prior art by providing a simple but effective method to substantially mitigate potentially severe degradations of the polarization extinction in in-band OSNR measurements that are caused by polarization fluctuations in the optical signal to be measured.

SUMMARY OF THE INVENTION

Accordingly, the present invention relates to a method for measuring the optical signal-to-noise ratio of an optical signal containing a plurality of wavelength channels having time-varying polarization states, comprising:

(a) filtering the optical signal to form a test signal comprising one of the wavelength channels or a selected optical frequency in one of the selected wavelength channels;

(b) transforming the polarization state of the test signal into a random or pseudo-random sequence of different transformed polarization states;

(c) analyzing the transformed polarization states of the test signal with a polarization filter at a predetermined fixed orientation;

(d) measuring optical power in the test signal transmitted through the polarization filter at each of the transformed polarization states in order to determine a maximum and a minimum measured optical signal power; and (e) calculating a polarization extinction ratio from the measurements of the maximum and minimum received signals in order to obtain an optical signal-to-noise ratio for the test signal;

wherein the measurement time in step (d) is sufficiently short so that the polarization state of the optical light signal in the selected wavelength channel is substantially constant during the measurement of the optical power, thereby limiting a degradation in the calculated polarization extinction ratio.

Another aspect of the present invention relates to an apparatus for measuring the optical signal-to-noise ratio of an optical signal containing a plurality of wavelength channels, which have time-varying polarizations states, comprising:

an optical filter for selecting a test signal comprising one of the wavelength channels in the optical signal or an optical frequency range in one of the wavelength channels;

a polarization scrambler for randomly or pseudo-randomly modulating the polarization state of the test signal at a first rate;

an adjustable optical polarization controller for transforming the polarization state of the test signal into a random or pseudo-random sequence of substantially-different polarization states at a second rate, which is slower than the first rate;

an optical polarization filter for analyzing the transformed polarization states of the test signal;

an optical detector for measuring the optical power in the test signal transmitted through the optical polarization filter as the polarization controller is varied through the sequence of settings in order to determine a maximum and a minimum measured optical signal power; and a signal processor for determining a maximum and a minimum measured optical power and for calculating a polarization extinction ratio from the measurements for the maximum and minimum received signals in order to obtain a signal-to-noise ratio for the test signal.

Another feature of the present invention provides an apparatus for measuring the optical signal-to-noise ratio of an optical signal containing a plurality of wavelength channels, which have fixed or time-varying polarizations states, comprising:

an optical filter for selecting a test signal comprising one of the plurality of wavelength channels in the optical signal or an optical frequency range in one of the wavelength channels;

a polarization controller for transforming the polarization state of the test signal into a random or pseudo-random sequence of substantially-different predetermined polarization states;

an optical polarization filter for analyzing the sequence of polarization states in the test signal;

an optical detector for measuring the optical power in the test signal transmitted through the polarization filter as the polarization controller is varied through the sequence of settings; and a signal processor for determining a maximum and a minimum measured optical power and for calculating a polarization extinction ratio from the maximum and minimum optical powers in order to obtain a signal-to-noise ratio for the selected wavelength channel;

wherein the polarization controller transforms the light signal in the selected wavelength channel cyclically through a random or pseudo-random sequence of predetermined polarization states in which any two succeeding polarization states are uncorrelated within a predetermined cycle period.

BRIEF DESCRIPTION OF THE DRAWINGS

The invention will be described in greater detail with reference to the accompanying drawings which represent preferred embodiments thereof, wherein:

FIGS. 6(a) to 6(f) illustrate OSNR measurement devices in accordance with the present invention;

FIGS. 7(a) to 7(d) illustrate OSNR measurement devices in accordance with the present invention;

DETAILED DESCRIPTION

Figure 1:
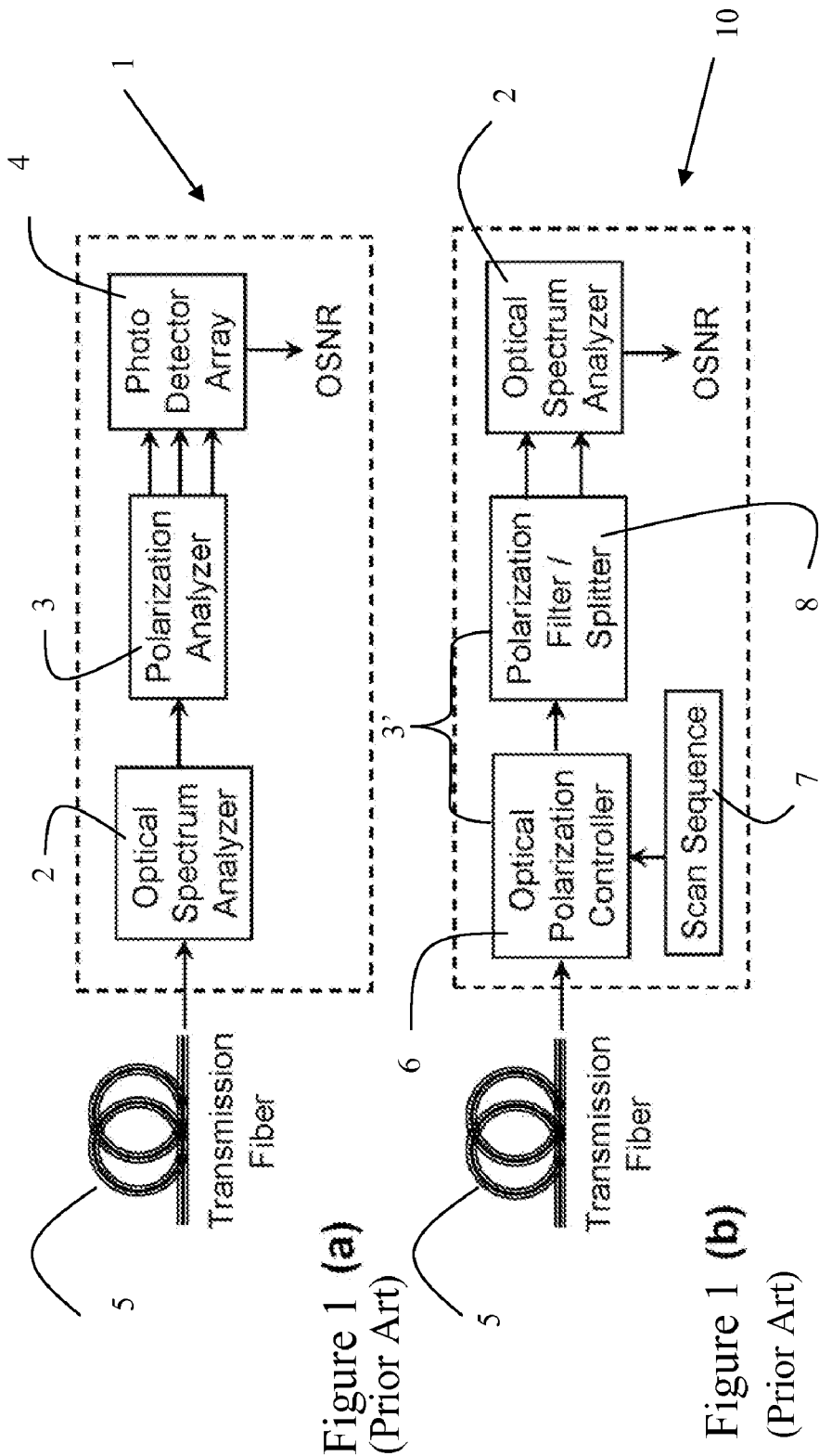
FIGS. 1(*a*) and 1(*b*) are a schematic illustrations of conventional OSNR measurement devices based on polarization analysis and polarization nulling.
Figure 2:
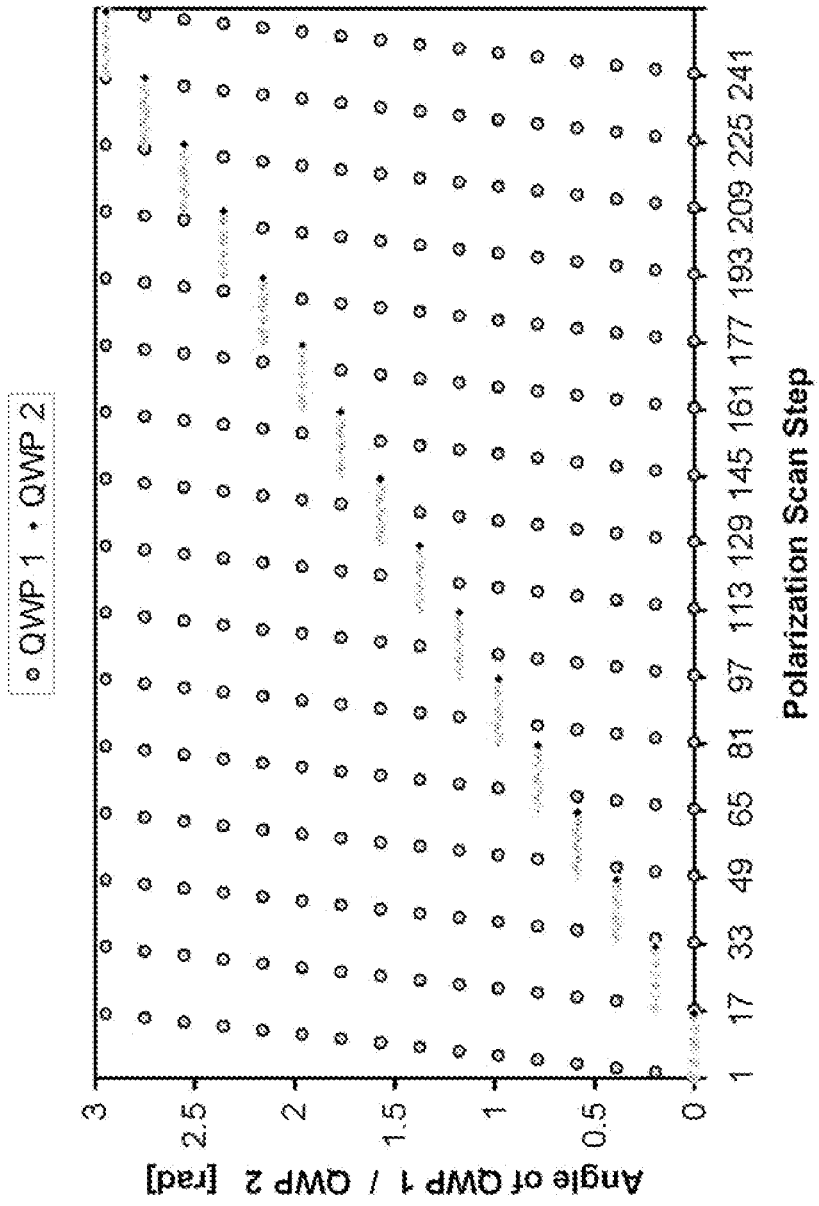
FIG. 2 is a plot of the polarization scan steps in a conventional OSNR measurement device with polarization nulling, wherein two rotatatable QWPs serve as the optical polarization controller.

Polarization controllers for transforming a given input polarization state into a multitude of output polarizations states normally are composed of several elements or stages, whereby each stage changes the state of polarization in a substantially different way. An exemplary embodiment of a polarization controller comprises a combination cascade of two optical wave plates at variable angular orientation, which may be composed of two rotatable quarter-wave plates (QWPs), as illustrated for example in FIG. 7(b), or of a QWP and a half-wave plate (HWP). The wave plates may be rotated mechanically or by means of a electro- or magneto-optic effect. To generate a suitable sequence of substantially different polarization states, the angular orientation of these wave plates may be adjusted in a number of predetermined steps and in a systematic fashion. In the above example, in which the polarization controller is comprised of two cascaded QWPs, the angle of each QWP may be varied in a number of steps N with fixed or variable step sizes that span a total range of at least 180° to generate the desired multitude of output polarization states. FIG. 2 illustrates an example of the sequence of angular orientations for the two QWPs in a systematic N×N scan using N=16 fixed angular steps of 11.25°, wherein for each of the N settings of the first QWP, the orientation of the second QWP is scanned sequentially through 180°.

It is well known to those skilled in the art that this sequence of angular adjustments of the two QWPs gives rise to a similar systematic variation in the output polarization state of the polarization controller, which substantially covers the entire Poincaré sphere. The highest extinction that the polarization-transformed optical information signal may experience in the polarization filter depends on the density and particular distribution of the probed polarization states, i.e. on N, as well as on the actual polarization state of the information signal. In the above example, the maximal polarization extinction (PE) of the optical information signal is about 17.3 dB for a time-constant input polarization state and when no unpolarized optical noise is present in the input signal. However, this value may decrease substantially when the polarization state of the information signal varies significantly between the various steps of the polarization scan. In the worst possible scenario, the polarization state of the information signal varies in such a way that, for the entire duration of the polarization scan, it is always orthogonal to the polarization state that is currently probed by the polarization controller. The situation is slightly different when a polarization splitter is used instead of a simple polarization filter and when the polarization state orthogonal to the probed state is simultaneously analyzed. In this case, the worst possible scenario of input polarization variations occurs when the signal polarization state is always a 50/50 combination of the currently probed pair of orthogonal polarization states.

Figure 3:
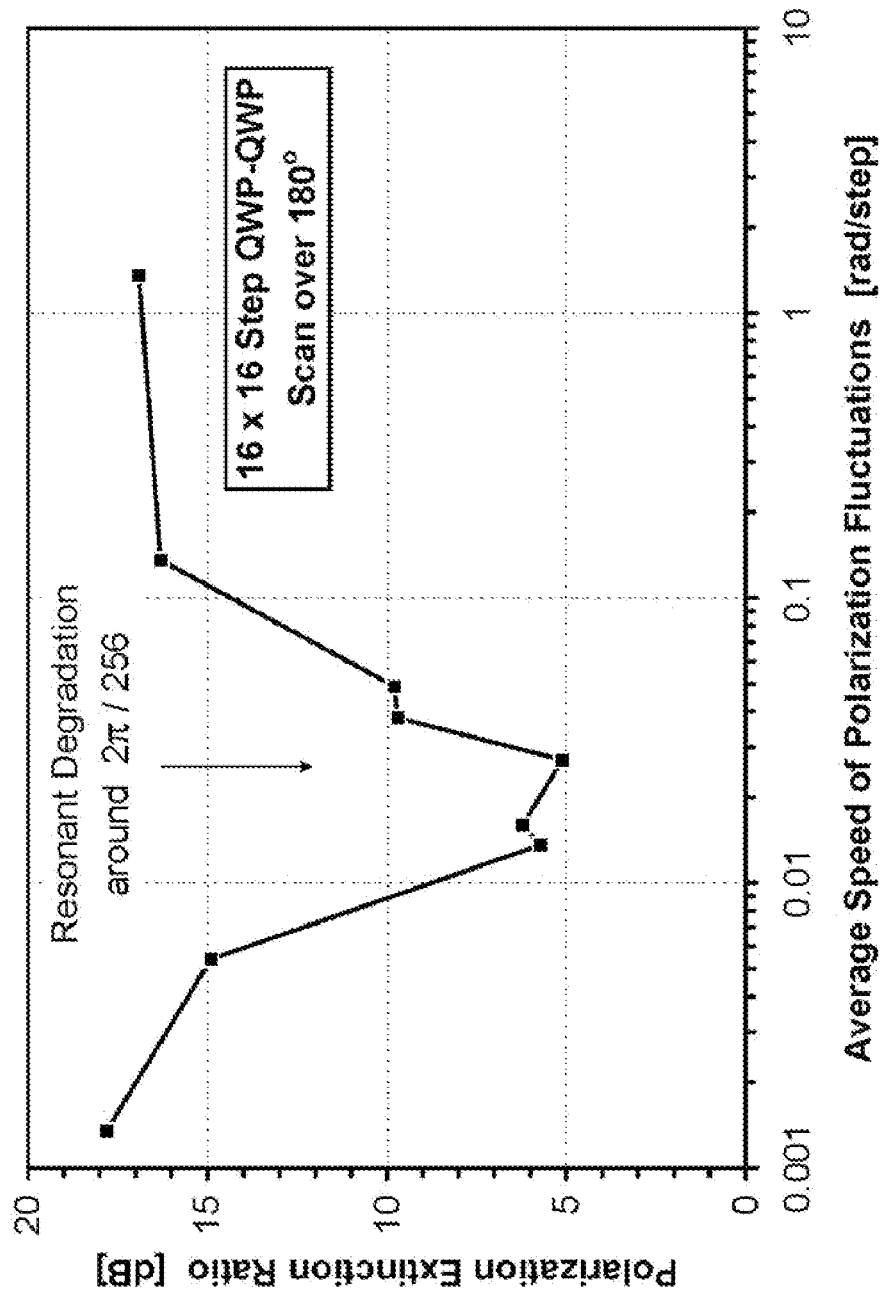
FIG. 3 is a plot of the polarization extinction ("PE") ratio measured by a conventional OSNR measurement device as a function of the average speed of random polarization fluctuations in the test signal.

Although the likelihood is extremely small that the polarization variations in the input optical signal are substantially synchronous with the polarization state variations generated by the polarization controller 6, in particular when the polarization fluctuations in the fiber are random, severe degradations of the PE due to polarization fluctuations may occur quite frequently when the average speed of the polarization fluctuations in the optical signal is of the same order of magnitude as the average speed of the polarization changes generated by the polarization controller 6. Severe degradations in the measured PE are observed even when the signal polarization state varies synchronously with the probed polarization states only during a relatively short part of the entire polarization scan, i.e. when the probed polarization state is substantially equal to the state that is blocked by the polarization filter 8. With reference to FIG. 3, the degradations of the PE are largest when the average speed of the polarization fluctuations in the information signal is of the same order of magnitude as the speed of the polarization changes generated by the polarization controller 6. The graph in FIG. 3 illustrates the worst-case PE ratio measured in the presence of random polarization fluctuations having various average speeds, wherein the average speed is expressed as the average change in phase retardation between each step of the polarization scan generated by the polarization controller 6. The severe PE degradations observed in FIG. 3 clearly are the result of random polarization fluctuations in the information signal to be measured which are temporarily synchronous or 'resonant' with the polarization changes generated by the polarization controller 6.

Figure 4:
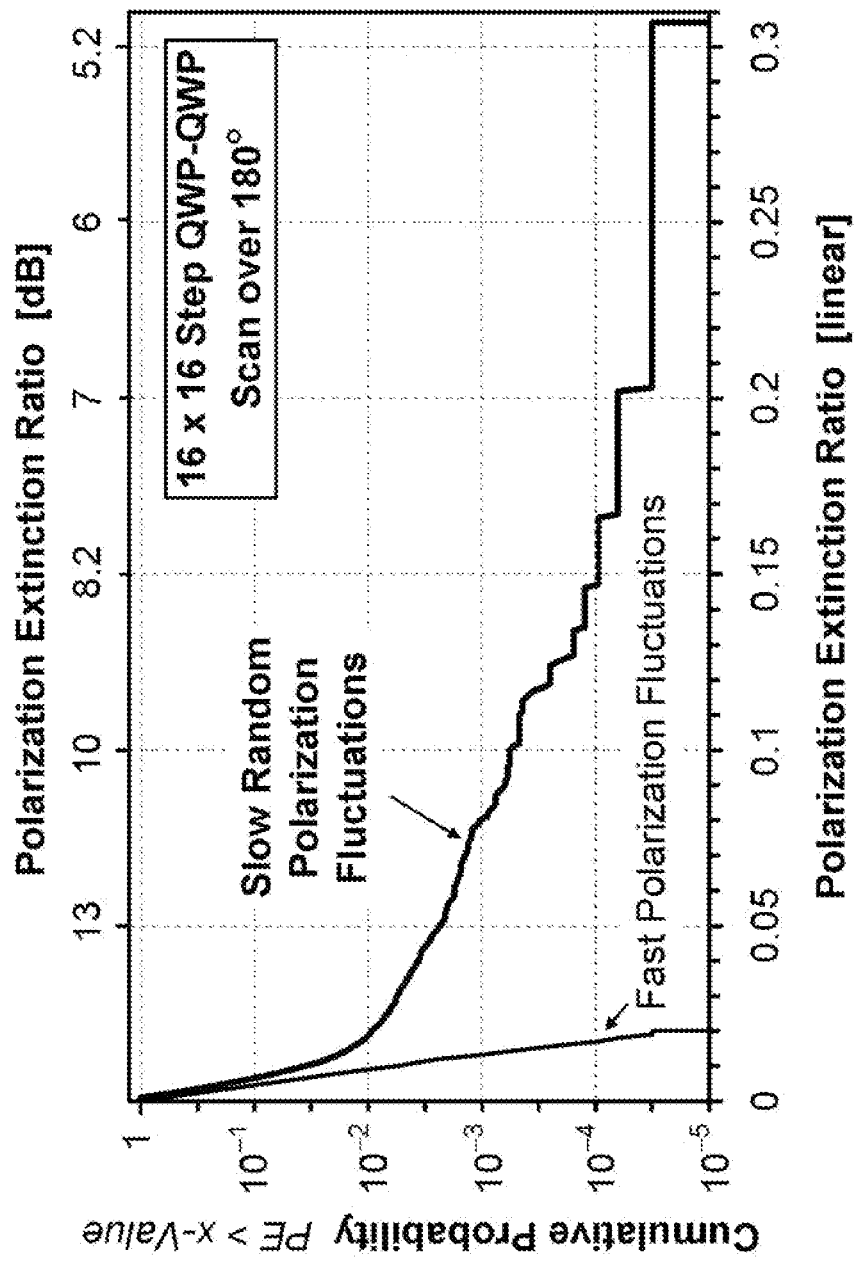
FIG. 4 is a plot of the cumulative probability of the PE ratio in a conventional OSNR measurement device to exceed given values when slow (0.027 rad/step) and fast (13.6 rad/step) polarization fluctuations are present in the test signal.

FIG. 3 also reveals that the likelihood of severe PE degradations reduces substantially when the polarization fluctuations in the information signal become several orders of magnitude faster than the polarization variations generated by the polarization controller 6. In particular, when the polarization state of the information signal fluctuates very rapidly and by large amounts between succeeding settings of the polarization controller 6, the probability of the PE ratio to exceed a certain maximal limit (wherein the PE is measured as a linear ratio) decreases exponentially with this limit. This is illustrated in FIG. 4, in which more than 30,000 polarization scans were numerically simulated, each for substantially different polarization fluctuations in the optical information signal, and the best polarization extinction ratio was calculated during each scan to determine the effect of polarization fluctuations. FIG. 4 displays the cumulative probability of the PE to exceed certain values for two different average speeds of random polarization fluctuations: the first curve shows the cumulative probability for relatively slow polarization fluctuations with an average speed of about 0.027 radian change in phase retardation per scan step of the polarization controller 6, whereas the second curve shows the cumulative probability for very fast polarization fluctuations with an average speed of about 13.6 rad per scan step. It is clearly evident in this graph that the likelihood of large PE degradations is much smaller for rapid polarization fluctuations than for relatively slow and potentially 'resonant' polarization fluctuations.

It is also evident from FIG. 4 that for fast random polarization fluctuations, the probability of the PE ratio to exceed a certain limit decreases exponentially with the limit (note that the probability in FIG. 4 is plotted on a logarithmic scale, whereas the PE ratio is plotted on a linear scale). As more clearly seen in FIG. 5, in which the cumulative PE probability for signals with very fast random polarization fluctuations is compared with that for a signal in a random, but constant, polarization state, there is a finite upper limit for the worst-case PE ratio when the signal polarization state is constant, whereas the PE ratio can become arbitrarily large when the signal polarization state fluctuates rapidly. However, it is very unlikely that in the case of rapid polarization fluctuations the PE ratio exceeds the upper PE ratio limit for stationary input polarization states. The probability for this to occur is substantially lower than $10^{-3}$.

Figure 5:
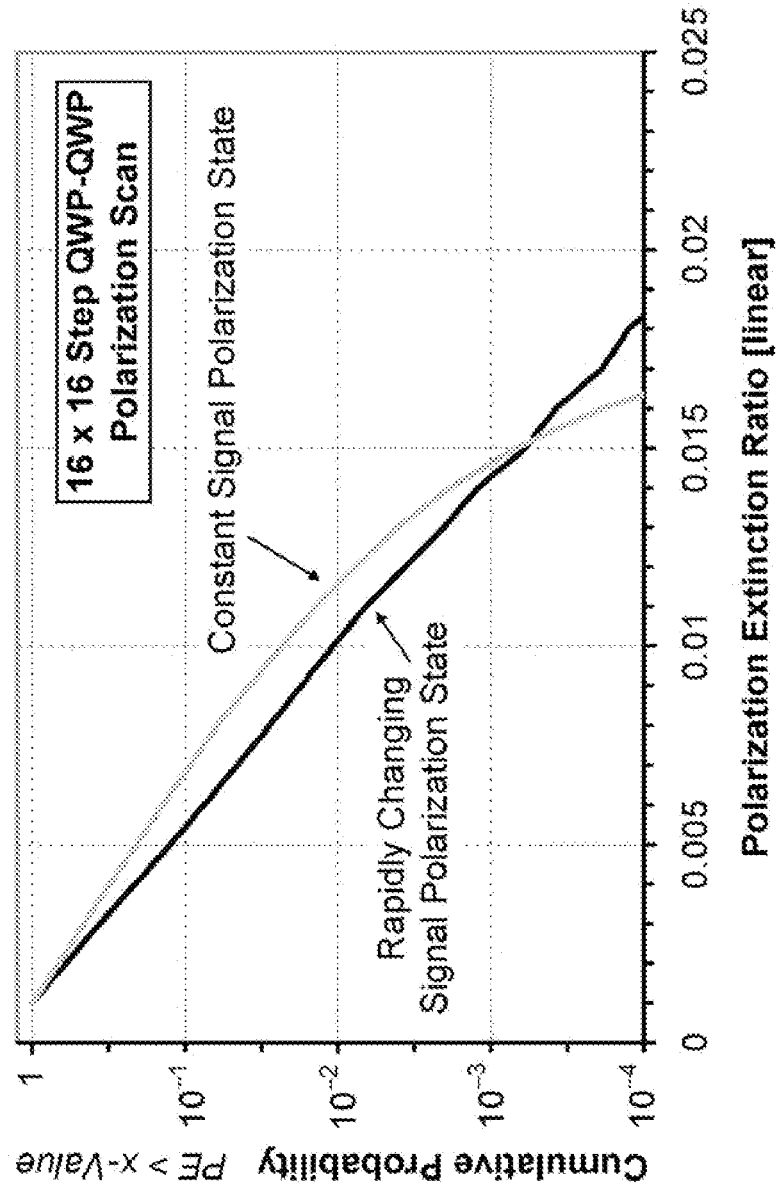
FIG. 5 is a plot of the cumulative probability of the PE ratio in a conventional OSNR measurement device for the case of a test signal with constant polarization state and for a signal with rapidly fluctuating polarization state.

Furthermore, FIG. 5 also reveals that random, but sufficiently rapid, polarization fluctuations in the optical signal may, in fact, increase the likelihood of low PE ratios to occur. For example, the likelihood of the linear PE ratio to exceed 0.01 (or −20 dB) is about $2.3 \times 10^{-2}$ when the signal polarization state is constant but only $1 \times 10^{-2}$ when it fluctuates rapidly. Hence, it may even be preferable to measure OSNRs in signals that exhibit large random polarization fluctuations.

The exponential decrease seen in FIG. 5 for the cumulative PE probability in case of rapid polarization fluctuations can be explained as follows. For the sake of simplicity, it is assumed that the various polarization states probed by the polarization controller 6 are spaced equidistantly on the Poincaré sphere. Then, for stationary input signal polarization, the worst-case PE ratio is obtained when the signal polarization state falls midway between any two adjacent probed polarization states, and the PE ratio is given by $\sin^2 \phi$, with $\phi$ denoting the angle between the probed and the actual polarization state. In the case of a rapidly fluctuating signal polarization state, the various signal polarization states present at each step of the polarization scan generated by polarization controller 6 may be viewed as independent random samples that are uniformly distributed on the Poincaré sphere. In order to obtain at least the same PE ratio as in the worst-case of a stationary signal polarization, at least one of these samples has to fall into an area centered around the currently probed polarization state which is defined by a circle having a radius equal to half the distance to the nearest probed polarization state. The probability of a given random input polarization state to fall outside of this circle is approximately equal to $(1-c/m)$, where m is the total number of probed polarization states, e.g. equal to N×N, and c is a constant. Hence, the probability that none of the m independent input polarization states falls into any of the circles around each probed polarization states is approximately equal to $(1-c/m)^m$, which for m>>1 becomes approximately equal to $e^{-c}$.

In a similar fashion, the cumulative probability for a PE ratio of half the worst-case limit for stationary input polarization states can be calculated, for which the area of the circle around each probed polarization state is reduced by a factor of 2. In this case, the probability that none of the m samples hits any of the areas around the probed polarization states is substantially equal to $e^{-2c}$. Therefore, the probability of the linear PE ratio to exceed a certain value decreases exponentially with this ratio.

While the above analysis assumed a simple polarization filter 8 and a single photo-detector 4, it may be readily extended to the case of a polarization splitter with two detectors that simultaneously analyze the probed polarization state as well as the polarization state orthogonal to it.

More importantly, it can be shown that even in cases where the rapid polarization fluctuations in the information signal are not completely random or not approximately equidistantly distributed on the Poincaré sphere, the statistical distribution of the PE ratio is substantially similar to the exponential distribution displayed in FIG. 5.

With reference to FIGS. 6(a) and 6(b), an OSNR measurement device 21 according to the present invention, includes a polarization scrambler 22 for generating random or pseudo-random polarization fluctuations in the optical signal in an artificial and pre-determined fashion that transforms a constant or only slowly varying input polarization state into a sequence of rapidly fluctuating random (or pseudo-random) polarization states, and a polarization controller 23, under control of a polarization scanner 24, for transforming the polarization state of the light signal into a sequence of substantially-different predetermined polarization states, similar to the sequence of polarization states generated by the polarization controller in FIG. 2. The speed of the polarization fluctuations generated by the polarization scrambler 22 should be several orders of magnitude faster than the polarization variations generated by the polarization controller 23. For practical applications, the speed of the polarization fluctuations generated by the polarization scrambler 22 should be at least 10 times faster than the polarization variations generated by the polarization controller 23, and may be up to 100 times faster, 1000 times faster or even more. The polarization controller 23 is adjusted in a predetermined way by the polarization scanner 24 to transform a constant input polarization state of a signal that is passed therethrough sequentially into a multitude of different optical polarization states, which are usually, but not necessarily, predetermined so that they substantially cover the entire Poincaré sphere.

An optical polarization filter/splitter 26 is provided for passing light of only a single predetermined polarization state or for passing light of a first polarization state to a first output port, and light of a second polarization, orthogonal to the first polarization, to a second output port for analyzing the transformed polarization states of the optical signal in the test signal. Various optical components have been designed for enabling only a single polarization state to pass or for separating a predetermined pair of orthogonal polarization states along different paths. An optical spectrum analyzer 27 is provided for filtering the optical signal to form a test signal comprising one of the wavelength channels or a selected optical frequency in one of the selected wavelength channels. An array of photodetectors 28 is included separately or with the optical spectrum analyzer 27 for measuring the optical power of each polarization state of each test signal. The OSNR can then be calculated in a suitable signal processor 29 based on the maximum and minimum power levels, as hereinbefore disclosed.

The polarization scrambler 22 may be placed before the input of the polarization controller 23, as shown in FIG. 6(a), or it may be placed after the polarization controller 23, as shown in OSNR measurement device 31 in FIG. 6(b). In any case, it is essential for obtaining a high polarization extinction ratio that the polarization scrambler 22 introduces large and rapid polarization variations for any general input polarization state thereto, in order to ensure that the output polarization state is substantially different at each setting of the polarization controller 23. A suitable polarization scrambler 22 that modulates the polarization state of an arbitrarily polarized input signal is described, for example, in U.S. Pat. No. 5,327,511 entitled "*Apparatus and Method Employing Fast Polarization Modulation to Reduce Effects of Polarization Hole Burning and Polarization Dependent Loss*" and, in more detail, in Optics Letters, Volume 20, Number 9 entitled "*Polarization-independent electro-optic depolarizer*," May 1995, which are incorporated herein by reference. In one embodiment, the speed of the polarization scrambler 22 is adjusted in such a way that it introduces polarization variations that, on average, are substantially equal to or greater than 1 rad between each setting of the polarization controller 23.

On the other hand, the polarization scrambler 22 should be operated in such a way and at such a speed that it does not introduce significant polarization changes during the short time period required by the photodetectors 28 to measure the optical power level at each setting of the polarization controller 23, because any significant polarization fluctuations during these measurements could severely degrade the measured PE ratios. Accordingly, the polarization scrambler 22 should be operated at a speed that is slow enough to not cause significant polarization changes during the power measurement.

The rapid polarization fluctuations which are generated by the polarization scrambler 22 add to the natural polarization fluctuations which are introduced in the fiber-optic transmission system. Therefore, the rapid polarization fluctuations generated by the scrambler 22 substantially reduce the likelihood of slow polarization fluctuations to occur in the input of the polarization controller 23, which may be synchronous with the polarization changes introduced by the polarization controller 23 and, thus, may cause potentially severe degradations of the measured PE ratio.

In an exemplary realization of the invention, the polarization scrambler 22 generates polarization fluctuations at an average speed between 30 and 300 rad/sec, and the time required to measure the optical power level is 20 µsec. Therefore, the polarization state changes only by about 0.0006 to 0.006 rad during each measurement of the optical power level, which does not cause a significant degradation in the determination of the PE ratio. Furthermore, the polarization controller 23 is cycled through 256 different polarization transformations, as shown in the example of FIG. 2, and changes the polarization state at an average rate between 0.003 and 0.3 rad/sec.

Figures 6C, 6D:
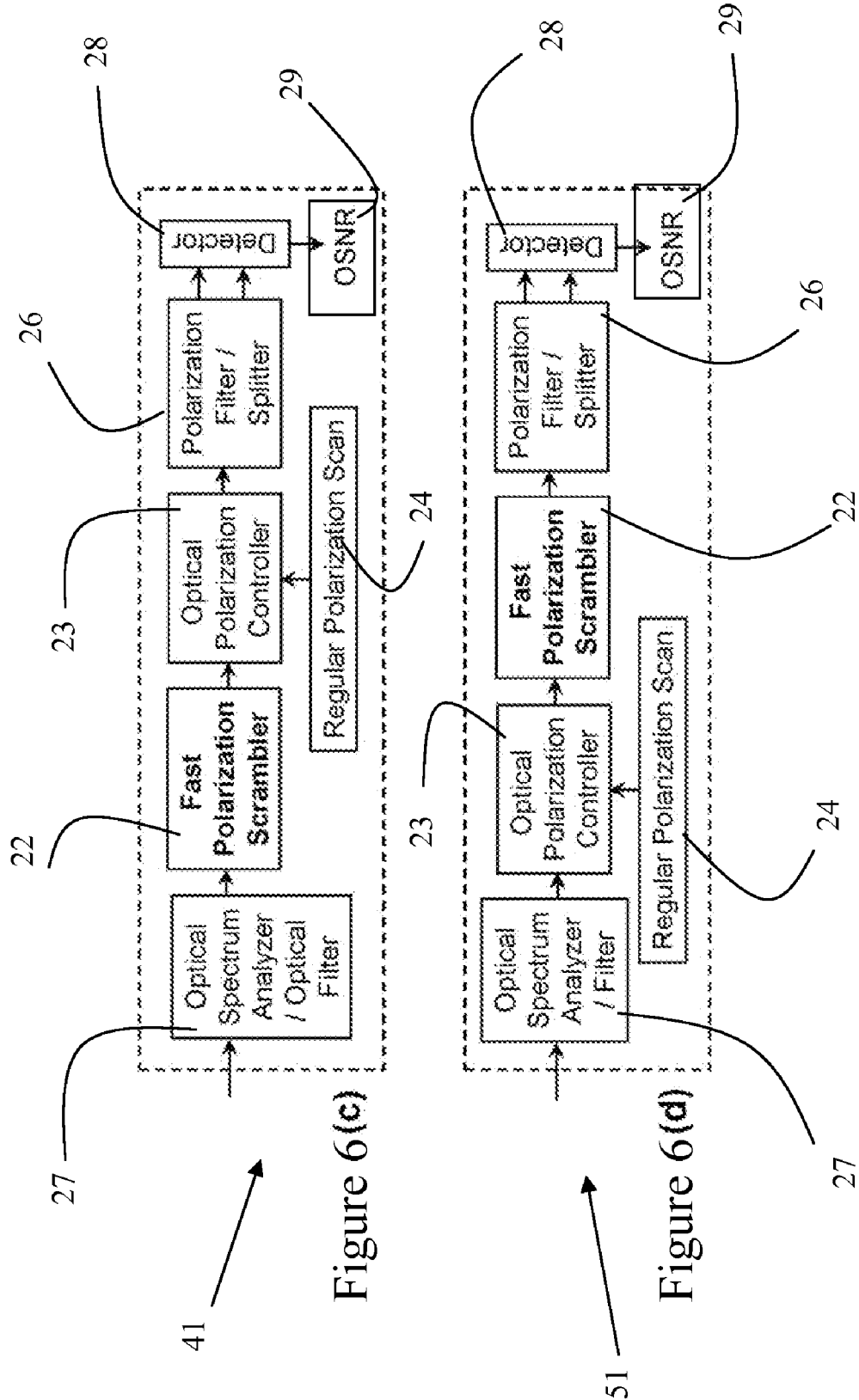

The sequence of the optical elements, illustrated in FIGS. 6(a) and 6(b), may be re-arranged in such a way that the optical signal is first filtered by the optical spectrum analyzer 27 (or a simple optical filter) to form the test signal, comprising one of the wavelength channels or a selected optical frequency in one of the selected wavelength channels, before entering the polarization scrambler 22 or polarization controller 23, as shown in OSNR measurement devices 41 and 51 in FIGS. 6(c) and 6(d), respectively. In yet another arrangement, the optical spectrum analyzer 27 (or optical filter) may be placed between the polarization controller 23 and the polarization scrambler 22. In the embodiments of FIGS. 6(c) and 6(d) the photodetectors 28 are separate from the optical spectrum analyzer 27, and disposed prior to the signal processor 29.

Preferably, the polarization scrambler 22 and the polarization controller 23 should be stopped during the power measurements performed by photodetectors 28, so that they do not change the polarization state during the short time intervals in which the transmitted optical power is measured. Therefore, the polarization controller 23 and the polarization scrambler 22 may be clocked synchronously and stopped during the power measurements. Accordingly, in a preferred embodiment of the present invention, the functions of the polarization scrambler 22 and polarization controller 23 may be combined and performed by a single optical polarization transformer 122, as shown in OSNR measurement devices 61 and 71 in FIGS. 6(e) and (f), respectively, without affecting the accuracy of the OSNR measurements. A suitable polarization transformer 122 that combines and can simultaneously perform the functions of polarization scrambler 22 and polarization controller 23 in FIGS. 6(a)-6(d) is described in U.S. Pat. No. 5,327,511 referenced above. As above, the optical spectrum analyzer 27 (or optical filter) can be positioned at the input before the polarization transformer 122, as in FIG. 6(f), or anywhere else, e.g. at the output of the polarization filter/splitter 26, as in FIG. 6(e).

In another embodiment of the present invention, illustrated in FIG. 7(a), random or pseudo-random polarization fluctuations, similar to those generated by polarization scrambler 22 in FIGS. 6(a)-6(d), are artificially introduced in the test signal directly by the polarization controller 23 using a randomized polarization scanner 124 for generating the polarization scan. Large and random (or pseudo-random) polarization fluctuations may be generated in the output of the polarization controller 23 by randomizing the settings of the control elements in the polarization controller 23. In an exemplary implementation of the polarization controller 23 as a combination cascade of first and second rotatable QWPs 125 and 126, respectively, see FIG. 7(b), such random polarization fluctuations may be generated by cycling the angular orientations of the first and second QWPs 125 and 126 periodically through a pseudo-random sequence of values, which are selected so that the sequence of generated polarization states is considered random, but which preferably, but not necessarily, includes a predetermined set of polarization states, which substantially cover the entire Poincaré sphere.

The polarization filter 26, the optical spectrum analyzer (filter) 27, the photodetectors 28 and the controller 29 are also provided, as hereinbefore described. As above, the optical spectrum analyzer 27 can also be positioned before the polarization controller 23 (FIG. 7c) or between the polarization controller 23 and the polarization filter 26 (FIG. 7d).

According to the present invention, the random polarization variations may be either superimposed on or, alternatively, combined with the systematic polarization scan, which is needed to find the maximal and minimal power levels after the polarization filter/splitter 26. In an exemplary implementation of this aspect of the invention, the random polarization variations are combined with the systematic polarization scan by cycling the first and second QWPs 125 and 126 through the same set of angular orientations used in a systematic polarization scan but in a different and randomized sequence. Such a randomized sequence of polarization states may be generated, for example, by first assigning an arbitrary but unique random number to each pair of the first and second QWP angles in the original systematic scan sequence (like the 256-step sequence shown in FIG. 2) and then re-ordering this sequence by sorting the assigned random numbers in ascending (or descending) order. An example of a randomly re-ordered QWP-QWP polarization scan with a total number of 256 steps is shown in FIG. 8.

Figure 8:
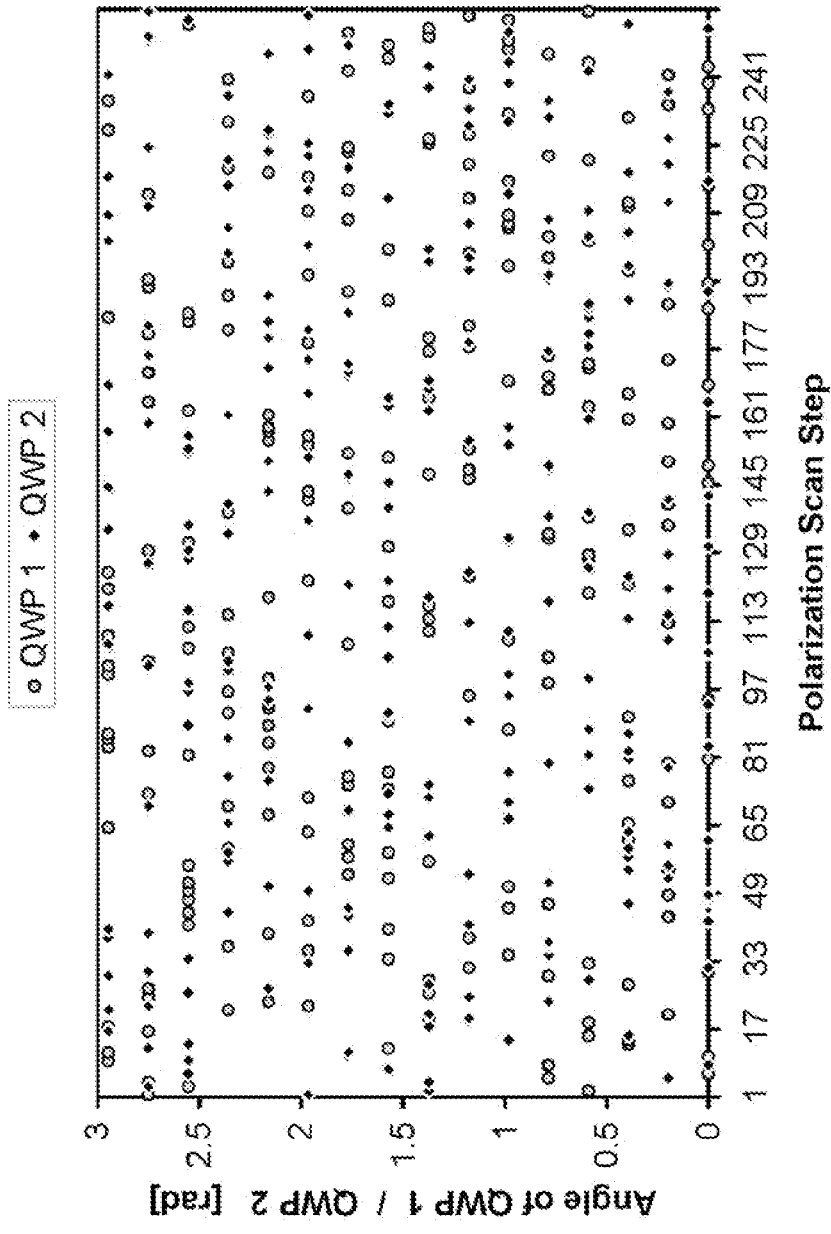
FIG. 8 is a plot of a randomized polarization scan designed in accordance with the present invention for a polarization controller comprising two rotatatable QWPs.
Figure 9:
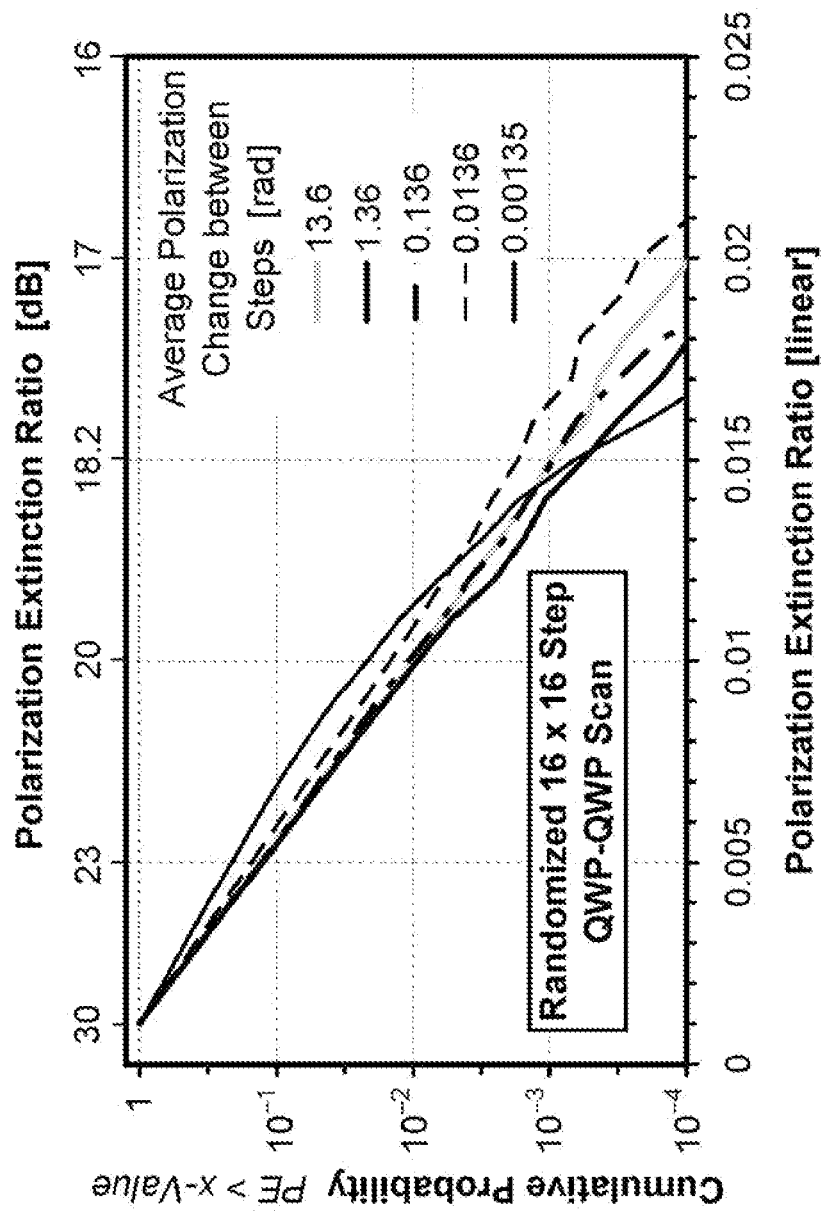
FIG. 9 is a plot of the cumulative probability of the PE ratio obtained with the randomized 16×16 polarization scan illustrated in FIG. 8.

The effect of using such randomized polarization scan is illustrated in FIG. 9, which displays numerically simulated PE statistics that were obtained by using the randomized polarization scan of FIG. 8 instead of the systemic scan of FIG. 2 to measure OSNR in the presence of random signal polarization fluctuations. The curves in FIG. 9 were calculated for random signal polarization fluctuations at five largely different average speeds, covering a range of several orders of magnitude. It is clearly evident from this graph that at all speeds, the PE statistics follow the same statistics as expected from the above analysis for signals with very rapidly fluctuating polarization state. In fact, at the four fastest speeds, the cumulative probability of large linear PE ratios to occur decreases exponentially with the linear PE ratio, at substantially the same slope, whereas the cumulative probability at the slowest speed approaches that for a signal with substantially constant polarization state, indicating a finite upper limit for the PE ratio. In contrast to the results shown in FIG. 4, there are no large PE ratio degradations at any of the five analyzed speeds which include those at which severe 'resonant' PE degradations are observed in FIG. 3.

Figure 10:
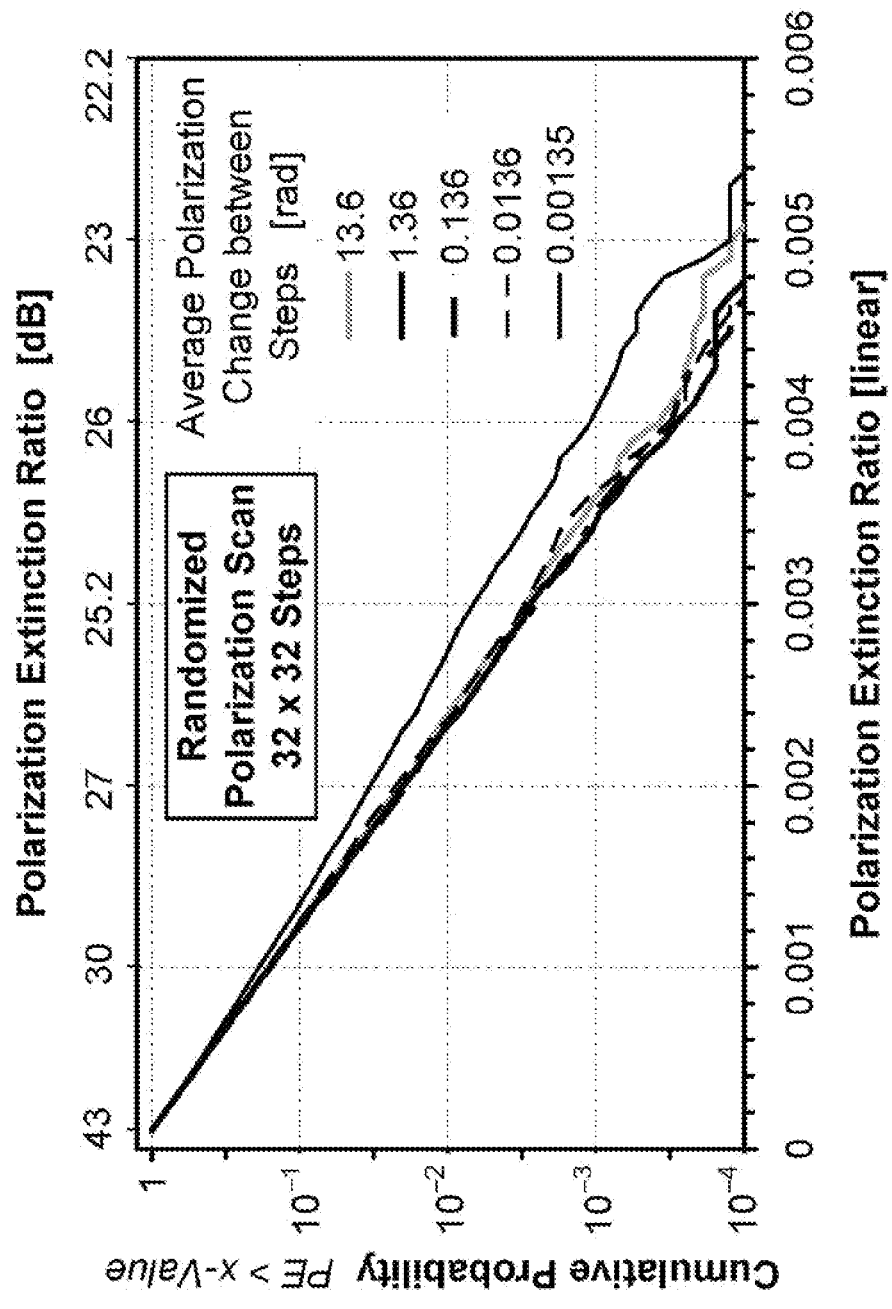
FIG. 10 is a plot of the cumulative probability of the PE ratio obtained with a randomized polarization scan comprising 32×32 individual scan steps.

FIG. 10 displays yet another set of numerically simulated PE statistics, which are obtained by using a similarly randomized 32×32 step QWP-QWP polarization scan. Again, the cumulative PE probabilities at all speeds are well behaved and decrease exponentially with the linear PE ratio.

Similarly randomized sequences of polarization states may be generated with many other types of polarization controllers that are capable of generating a desired systematic polarization scan. The present invention, therefore, is not limited to polarization controllers employing combination cascades of rotating wave plates, such as cascaded rotating QWPs or combinations of rotating QWPs and HWPs.

The accuracy of an OSNR measurement may be further improved by making a first OSNR measurement with a first randomized polarization scan and then making a second OSNR measurement with a second, substantially differently randomized polarization scan. It can be expected that one of these measurements should yield a higher PE ratio than the other measurement and, therefore, a higher (and thus more accurate) OSNR value. Moreover, this procedure may be repeated several times to obtain the most accurate OSNR measurement.

I claim:

1. A method for measuring the optical signal-to-noise ratio of an optical signal containing a plurality of wavelength channels having time-varying polarization states, comprising:
   (a) filtering the optical signal to form a test signal comprising one of the wavelength channels or a selected optical frequency in one of the selected wavelength channels;
   (b) transforming the polarization state of the test signal into a random or pseudo-random sequence of different transformed polarization states;
   (c) analyzing the transformed polarization states of the test signal with an optical spectrum analyzer and a polarization filter at a predetermined fixed orientation;
   (d) measuring optical power in the test signal transmitted through the polarization filter at each of the transformed polarization states in order to determine a maximum and a minimum measured optical signal power; and
   (e) calculating a polarization extinction ratio from the measurements of the maximum and minimum received signals in order to obtain an optical signal-to-noise ratio for the test signal;
   wherein the measurement time in step (d) is sufficiently short so that the polarization state of the optical light signal in the selected wavelength channel is substantially constant during the measurement of the optical power, thereby limiting a degradation in the calculated polarization extinction ratio; and
   wherein step (b) comprises:
   i) randomly or pseudo-randomly modulating the state of polarization of the test signal at a first rate; and
   ii) transforming the modulated polarization state of the test signal into the random or pseudo-random sequence of different polarization states at a second rate slower than the first rate.

2. The method according to claim 1, wherein the sequence of transformed polarization states generated in step (b) substantially covers the entire Poincaré sphere.

3. The method according to claim 1, wherein the sequence of transformed polarization states generated in step (b) is composed of statistically independent polarization states in which any two succeeding polarization states are uncorrelated.

4. The method according to claim 1, wherein the polarization states generated in step (b) are different for each calculation in step (e) in which an optical signal-to-noise ratio for the light signal in the selected wavelength channel is calculated.

5. The method according to claim 1, wherein step (c) comprises splitting the test signal into a pair of predetermined orthogonal polarization states, and wherein step (d) comprises measuring optical powers in both orthogonal polarization states.

6. A method for measuring the optical signal-to-noise ratio of an optical signal containing a plurality of wavelength channels having time-varying polarization states, comprising:
   (a) filtering the optical signal to form a test signal comprising one of the wavelength channels or a selected optical frequency in one of the selected wavelength channels;
   (b) transforming the polarization state of the test signal into a random or pseudo-random sequence of different transformed polarization states;
   (c) analyzing the transformed polarization states of the test signal with an optical spectrum analyzer and a polarization filter at a predetermined fixed orientation;
   (d) measuring optical power in the test signal transmitted through the polarization filter at each of the transformed polarization states in order to determine a maximum and a minimum measured optical signal power; and
   (e) calculating a polarization extinction ratio from the measurements of the maximum and minimum received signals in order to obtain an optical signal-to-noise ratio for the test signal;
   wherein the measurement time in step (d) is sufficiently short so that the polarization state of the optical light signal in the selected wavelength channel is substantially constant during the measurement of the optical power, thereby limiting a degradation in the calculated polarization extinction ratio; and
   wherein step (b) comprises:
   i) transforming the polarization state of the test signal into a predetermined sequence of different polarization states; and
   ii) randomly or pseudo-randomly modulating the state of polarization of the transformed test signal for each state of said sequence of different polarization states at a rate which is substantially faster than the time-varying polarization changes in said sequence of different polarization states.

7. An apparatus for measuring the optical signal-to-noise ratio of an optical signal containing a plurality of wavelength channels, which have time-varying polarizations states, comprising:
   an optical filter for selecting a test signal comprising one of the wavelength channels in the optical signal or an optical frequency range in one of the wavelength channels;
   a polarization scrambler for randomly or pseudo-randomly modulating the polarization state of the test signal at a first rate;
   an adjustable optical polarization controller for transforming the polarization state of the test signal into a random or pseudo-random sequence of substantially-different polarization states at a second rate, which is slower than the first rate;
   an optical polarization filter and an optical spectrum analyzer for analyzing the transformed polarization states of the test signal;

an optical detector for measuring the optical power in the test signal transmitted through the optical polarization filter as the polarization controller is varied through the sequence of settings in order to determine a maximum and a minimum measured optical signal power; and a signal processor for determining a maximum and a minimum measured optical power and for calculating a polarization extinction ratio from the measurements for the maximum and minimum received signals in order to obtain a signal-to-noise ratio for the test signal.

8. The apparatus according to claim 7, wherein said first rate is sufficiently slow, whereby the state of polarization does not change significantly during the measurement of the optical signal power, thereby limiting a degradation in the polarization extinction ratio determination due to the time varying polarization states.

9. The apparatus according to claim 7, wherein said polarization scrambler and polarization controller are stopped during the measurement of the optical signal power, thereby limiting a degradation in the polarization extinction ratio determination due to time varying polarization states.

10. The apparatus according to claim 7, wherein said polarization controller comprises a cascade of two rotatable quarter-wave plates, and wherein the angular orientations of the two quarter-wave plates are varied randomly or pseudo-randomly and independently over a range of at least 180°.

11. The apparatus according to claim 7, wherein the sequence of transformed polarization states generated in the adjustable optical polarization controller substantially covers the entire Poincaré sphere.

12. The apparatus according to claim 7, wherein the sequence of transformed polarization states generated in the optical polarization controller is composed of statistically independent polarization states in which any two succeeding polarization states are uncorrelated.

13. The apparatus according to claim 7, wherein the polarization states generated in the optical polarization controller are different for each calculation of the signal processor in which an optical signal-to-noise ratio for the light signal in the selected wavelength channel is calculated.

14. A method for measuring the optical signal-to-noise ratio of an optical signal containing a plurality of wavelength channels having time-varying polarization states, comprising:
   transforming the polarization state of the optical signal into a random or pseudo-random sequence of different transformed polarization states;
   analyzing the transformed polarization states of the optical signal with an optical spectrum analyzer and a polarization filter at a predetermined fixed orientation;
   filtering the optical signal to form a test signal comprising one of the wavelength channels or a selected optical frequency in one of the selected wavelength channels;
   (d) measuring optical power in the test signal transmitted through the polarization filter at each of the transformed polarization states in order to determine a maximum and a minimum measured optical signal power; and
   (e) calculating a polarization extinction ratio from the measurements of the maximum and minimum received signals in order to obtain an optical signal-to-noise ratio for the test signal; wherein the measurement time in the step of measuring optical power is sufficiently short so that the polarization state of the optical light signal in the selected wavelength channel is substantially constant during the measurement of the optical power, thereby limiting a degradation in the calculated polarization extinction ratio; and
   wherein the step of transforming the polarization state of the optical signal comprises:
   i) randomly or pseudo-randomly modulating the state of polarization of the optical signal at a first rate; and
   ii) transforming the modulated polarization state of the optical signal into the random or pseudo-random sequence of different polarization states at a second rate slower than the first rate.

15. The apparatus according to claim 14, wherein the optical polarization filter splits the test signal into the first and a second orthogonal polarization states, and measures optical powers in both the first and second orthogonal polarization states.

16. A method for measuring the optical signal-to-noise ratio of an optical signal containing a plurality of wavelength channels having time-varying polarization states, comprising:
   (b) transforming the polarization state of the optical signal into a random or pseudo-random sequence of different transformed polarization states;
   (a) filtering the optical signal to form a test signal comprising one of the wavelength channels or a selected optical frequency in one of the selected wavelength channels;
   (c) analyzing the transformed polarization states of the test signal with an optical spectrum analyzer and a polarization filter at a predetermined fixed orientation;
   (d) measuring optical power in the test signal transmitted through the polarization filter at each of the transformed polarization states in order to determine a maximum and a minimum measured optical signal power; and
   (e) calculating a polarization extinction ratio from the measurements of the maximum and minimum received signals in order to obtain an optical signal-to-noise ratio for the test signal; wherein the measurement time in the step of measuring optical power is sufficiently short so that the polarization state of the optical light signal in the selected wavelength channel is substantially constant during the measurement of the optical power, thereby limiting a degradation in the calculated polarization extinction ratio; and
   wherein the step of transforming the polarization state of the optical signal comprises:
   i) randomly or pseudo-randomly modulating the state of polarization of the test signal at a first rate; and
   ii) transforming the modulated polarization state of the test signal into the random or pseudo-random sequence of different polarization states at a second rate slower than the first rate.

* * * * *